No. 766,066. PATENTED JULY 26, 1904.
R. A. SANDERS.
COVER FOR POTS OR KETTLES.
APPLICATION FILED MAY 13, 1903.
NO MODEL.
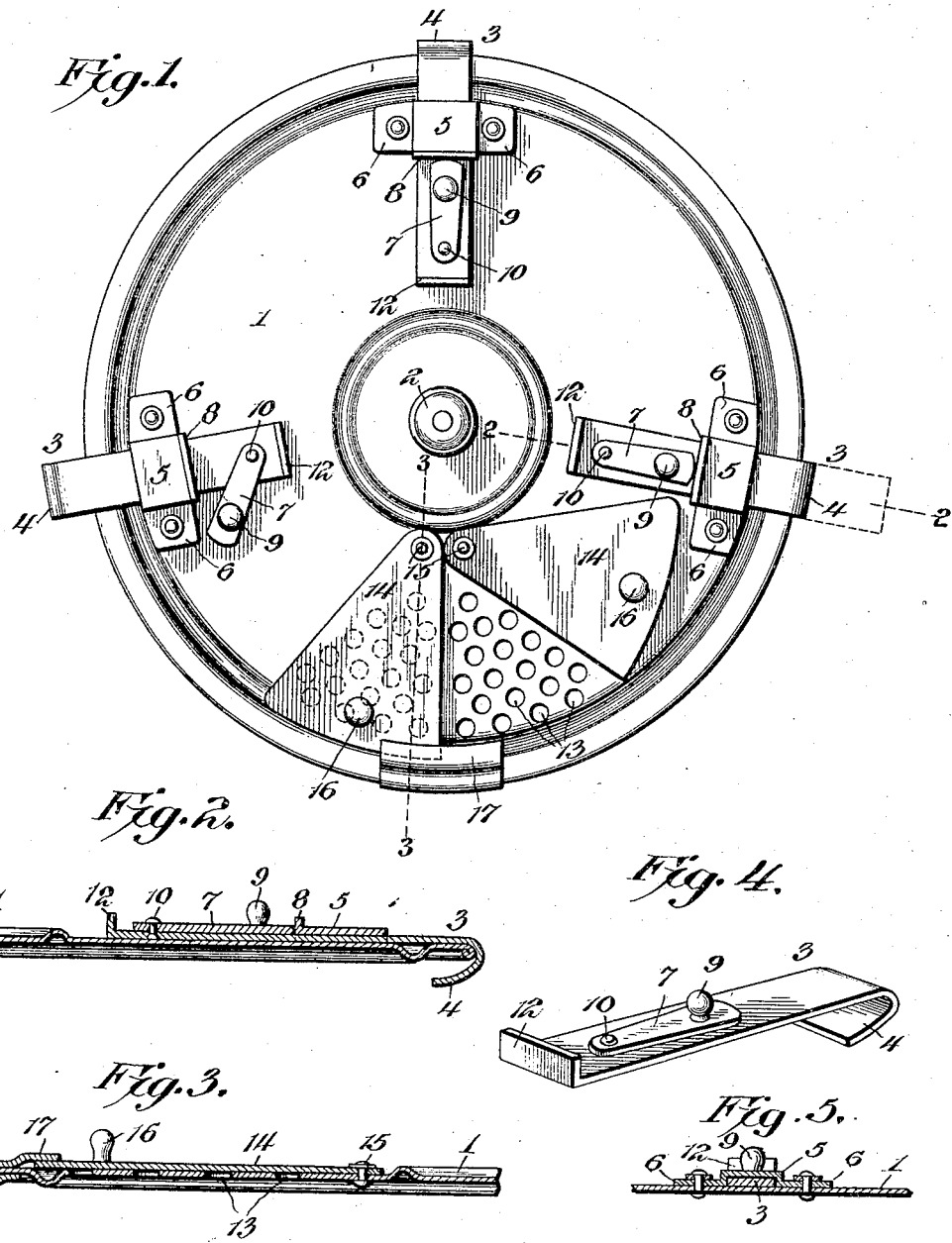
Rhoda Anna Sanders, Inventor,
Witnesses No. 766,066. Patented July 26, 1904.

UNITED STATES PATENT OFFICE.

RHODA ANNA SANDERS, OF FLINT, MICHIGAN.

COVER FOR POTS OR KETTLES.

SPECIFICATION forming part of Letters Patent No. 766,066, dated July 26, 1904.

Application filed May 13, 1903. Serial No. 156,967. (No model.)

*To all whom it may concern:*

Be it known that I, RHODA ANNA SANDERS, a citizen of the United States, residing at Flint, in the county of Genesee and State of Michigan, have invented a new and useful Cover for Pots or Kettles, of which the following is a specification.

The invention relates to improvements in covers for pots, kettles, and analogous receptacles.

The object of the present invention is to provide for pots, kettles, and analogous receptacles a simple, inexpensive, and efficient cover capable of being securely fastened to such a receptacle and adapted to retain the solid contents of a receptacle within the same while draining off the water or other liquid contents.

A further object of the invention is to provide a cover of this character which will be effectually prevented from becoming accidentally displaced by the contents of the receptacle while draining the latter, so that there will be no liability of the operator's hands coming in contact with a hot liquid.

The invention also has for its object to provide a cover which when not in use for draining the contents of a pot or analogous receptacle will form substantially a steam-tight closure for the same.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a plan view of a cover constructed in accordance with this invention. Fig. 2 is a sectional view on the line 2 2 of Fig. 1. Fig. 3 is a similar view on the line 3 3 of Fig. 1. Fig. 4 is a detail perspective view of one of the sliding catches. Fig. 5 is a detail sectional view taken longitudinally of one of the guides.

Like numerals of reference designate corresponding parts in all the figures of the drawings.

1 designates a cover constructed of suitable material, such as tin or other sheet metal, and provided with a central knob or handle 2 and having a series of peripheral catches 3, adapted to engage the rim or bead at the upper edge of a pot, kettle, or analogous receptacle, whereby the cover is securely fastened on such receptacle and is effectually prevented from becoming accidentally displaced therefrom. Each catch consists of a strip or piece of metal provided at its outer end with a hook 4 for engaging the receptacle to which the cover is applied, and the cover is provided with guides 5, in which the catches are arranged. The guide 5, which may be of any desired construction, is provided with a rectangular opening to receive the catch, and it has extensions or ears 6, which may be riveted or otherwise secured to the cover. The guide is angularly bent between its ends, as clearly shown in Fig. 5, to form the opening for the catch, and it may be cast or otherwise constructed, as will be readily understood. The catch is adapted to be moved inward and outward to engage it with and disengage it from a receptacle, and it is locked in engagement with the latter by means of a pivoted locking device 7, which is mounted on the catch near the inner end thereof and which is adapted to engage the flange 8 of the guide. The flange 8 is formed integral with and extends upward from the inner edge of the central part of the guide, as clearly shown in Fig. 2 of the drawings, and the locking device 7, which is provided with a knob or grip 9, is secured to the catch at its inner end by a rivet 10 or other suitable fastening device. The inner end of the catch is provided with a lip or flange 12, which extends upward or outward from the cover and which is adapted to be readily grasped by the operator.

The locking device is arranged to swing transversely of the catch, and when disposed longitudinally of the same it engages the projecting flange of the guide, whereby the catch is securely held against outward movement. When it is desired to disengage the catch from the receptacle, the locking device is swung laterally to disengage it from the flange 8, and the catch is then moved outward.

The cover is provided at one side with perforations 13 to form a strainer for enabling the liquid contents of a receptacle to be drained off. These perforations 13, which may be of any desired number, are covered when the strainer is not in use by a pair of pivoted closures 14, consisting of approximately sector-shaped plates. The closures are pivoted at their inner ends by rivets 15 or other suitable fastening devices, and they are provided near their outer ends with knobs or grips 16. When the pivoted plates or closures are arranged over the perforations or openings 13, they are held firmly against the cover by means of a keeper 17, projecting inward from the periphery of the cover and extending over the outer edges of the closures. The keeper, which may be constructed in any desired manner, preferably consists of a piece of metal secured to the lower face of the cover and bent upward and inward over the same, as clearly shown in Fig. 3; but it may be applied to the cover in any other desired manner.

The catches are adapted to engage firmly a receptacle at the upper edges thereof, and the cover is securely held on the receptacle by the said catches, so that there is no liability of the cover becoming accidentally misplaced when it is used as a strainer and is subjected to the pressure of the contents of the receptacle.

The projecting flanges at the inner edges of the top portions of the guides form broad faces for engagement with the pivoted locking devices of the catches, so that there will be no liability of the said locking devices accidentally slipping over or under the tops of the keepers.

What I claim is—

1. A device of the class described, comprising a cover provided with a series of guides consisting of angularly-bent plates secured at their ends to the body of the cover, and provided at their intermediate portions with upwardly-projecting flanges located at the inner sides of the guides, slidable catches mounted in the guides and having their ends bent in opposite directions, the outer ends being bent downward and inward to form hooks, and their inner ends being bent upward to form handles, and locking devices pivoted to the inner portions of the catches between the said handles and the guides and arranged to engage the flanges of the latter, whereby the hooks are held in engagement with a receptacle, substantially as described.

2. A device of the class described, comprising a cover provided with perforations to form a strainer, a pair of sector-shaped closures pivoted at their inner ends to the cover and having curved outer edges arranged concentric with the cover when the closures are in their closed position, and a keeper consisting of an approximately U-shaped plate or piece bent around the edge of the cover and secured to the same, the upper portion of the keeper overlapping the abutting portions of the closures at the outer edges thereof, substantially as described.

In testimony that I claim the foregoing as my own I have hereto affixed my signature in the presence of two witnesses.

RHODA ANNA SANDERS.

Witnesses:
    ELLEN M. LONG,
    GUY M. WILSON.